Figure 5:
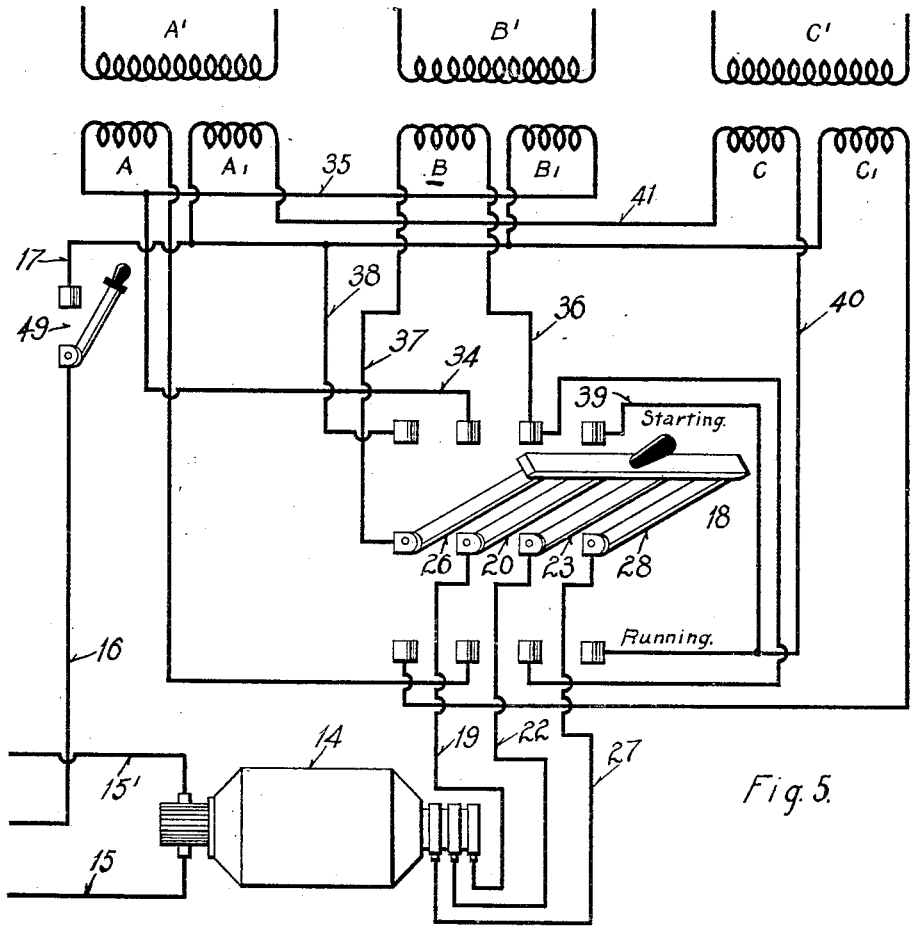

W. M. DANN & H. H. RUDD.
METHOD OF STARTING THREE-PHASE, THREE-WIRE ROTARY CONVERTERS.
APPLICATION FILED APR. 12, 1915.
1,272,632.
Patented July 16, 1918.
3 SHEETS—SHEET 1.
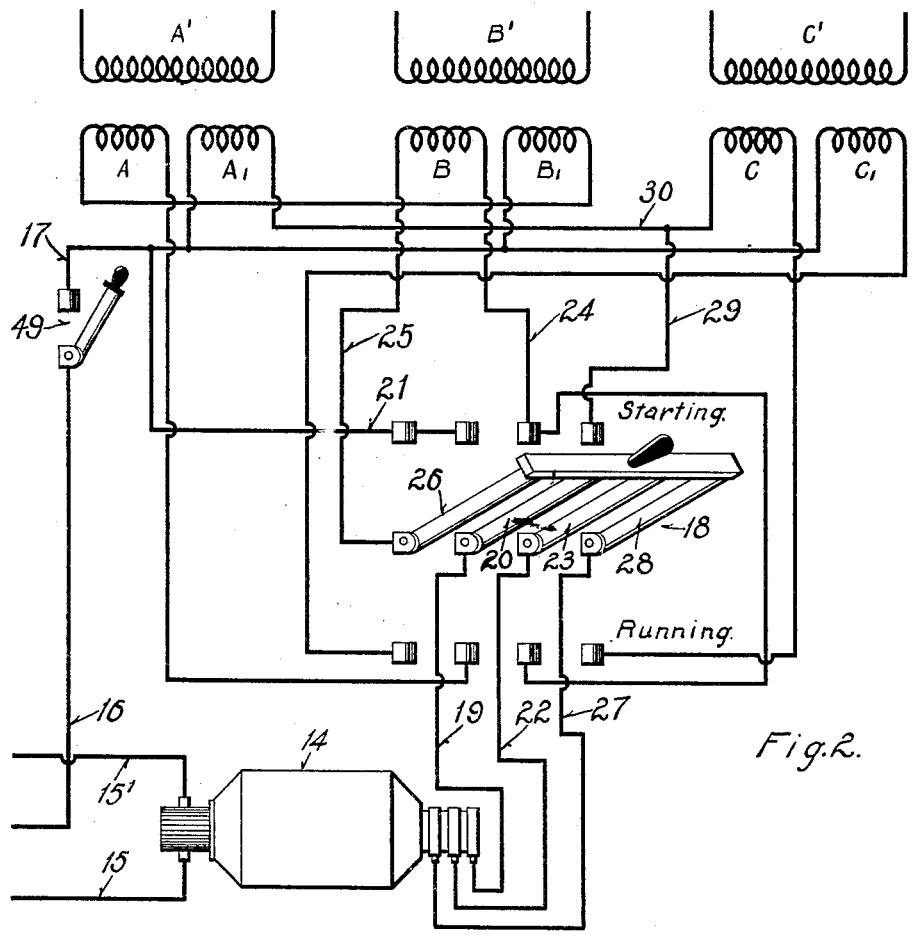
Fig. 2.
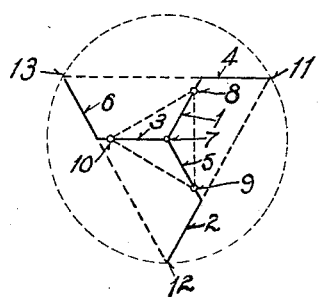
Fig. 1.
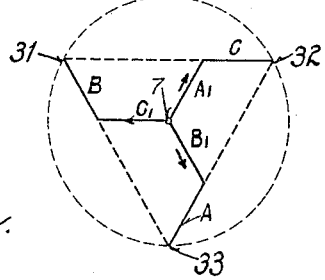
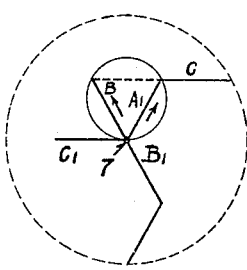
Fig. 3.
WITNESSES:
R. J. Fitzgerald
Geo. W. Hansen
INVENTORS
Walter M. Dann, and
Harold H. Rudd.
BY
Wesley G. Carr
ATTORNEY W. M. DANN & H. H. RUDD.
METHOD OF STARTING THREE-PHASE, THREE-WIRE ROTARY CONVERTERS.
APPLICATION FILED APR. 12, 1915.

1,272,632.

Patented July 16, 1918.

3 SHEETS—SHEET 2.

WITNESSES:
R. J. Fitzgerald
Geo. W. Hansen

INVENTORS
Walter M. Dann, and
Harold H. Rudd.
BY
Wesley G. Carr
ATTORNEY

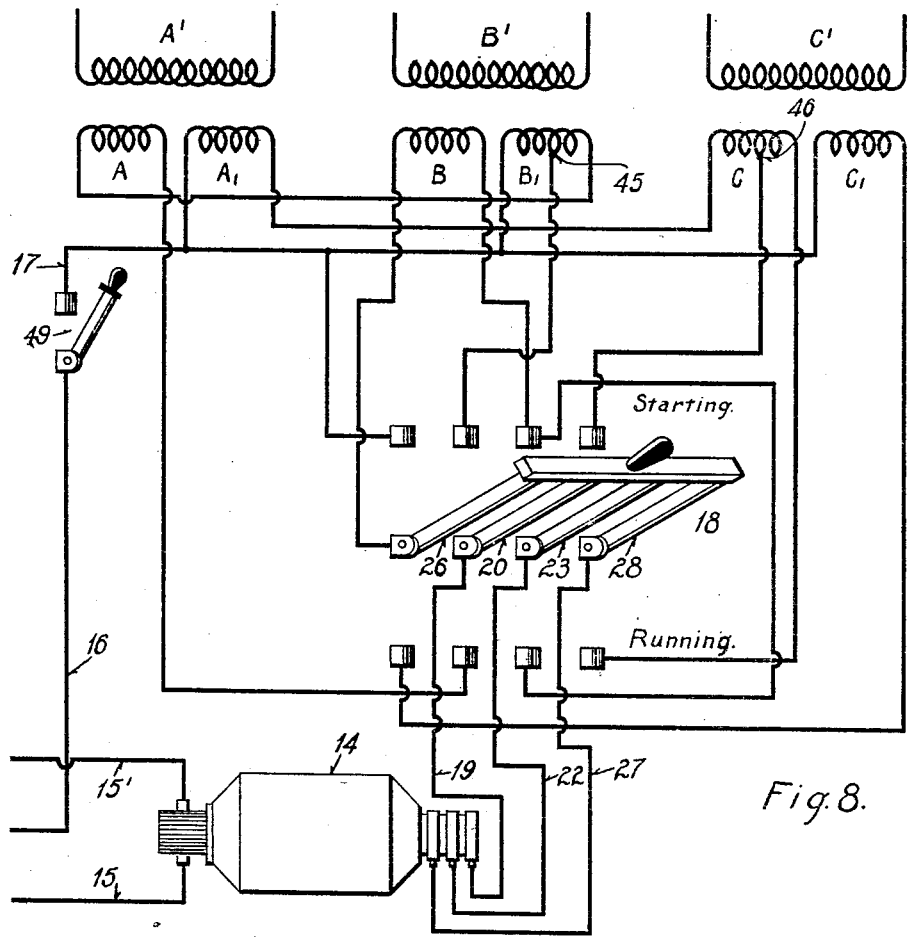
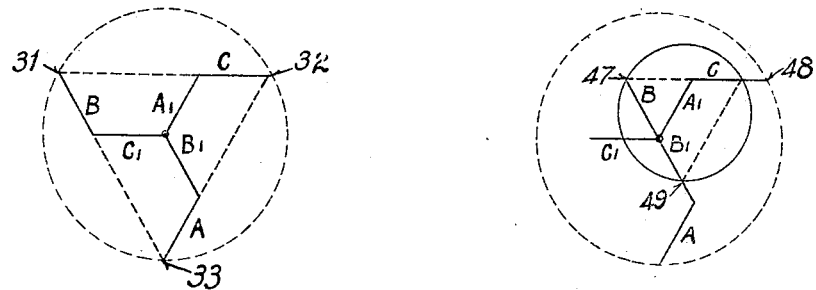

UNITED STATES PATENT OFFICE.

WALTER M. DANN, OF WILKINSBURG, AND HAROLD H. RUDD, OF EDGEWOOD, PENNSYLVANIA, ASSIGNORS TO WESTINGHOUSE ELECTRIC AND MANUFACTURING COMPANY, A CORPORATION OF PENNSYLVANIA.

METHOD OF STARTING THREE-PHASE, THREE-WIRE ROTARY CONVERTERS.

1,272,632.

Specification of Letters Patent.

Patented July 16, 1918.

Application filed April 12, 1915. Serial No. 20,688.

*To all whom it may concern:*

Be it known that we, WALTER M. DANN, a citizen of the United States, and a resident of Wilkinsburg, in the county of Allegheny and State of Pennsylvania, and HAROLD H. RUDD, a citizen of the United States, and a resident of Edgewood, in the county of Allegheny and State of Pennsylvania, have invented a new and useful Improvement in Methods of Starting Three-Phase, Three-Wire Rotary Converters, of which the following is a specification.

Our invention relates to means for starting dynamo-electric machines, and it has special reference to means that may be employed for starting a rotary converter from its alternating-current side.

More particularly, our invention relates to means for starting a three-phase, three-wire rotary converter which is electrically connected, through a switching mechanism, to a bank of transformers that is, in turn, supplied with power from a source of three-phase currents.

It is usual to operate rotary converters which deliver power to three-wire, direct-current distributing systems from interconnected star transformer windings. Each of the three phases of the interconnected-star winding comprises two windings that are excited from separate phases of the supply source. To illustrate, the winding A of one phase is connected in series with the winding $B_1$ of another phase, likewise the winding B is connected in series with the winding $C_1$, and the winding C is connected in series with the winding $A_1$. This method of connecting transformer windings is well known in the art and the grouping is designated as an interconnected-star formation. In this manner, a neutral point is provided on the transformer windings in order to neutralize the effects of the unbalanced direct currents which flow through the transformer windings by reason of the neutral wire of the three-wire system being connected to this neutral point. When it is desired to start a self-starting rotary converter of this description, by connecting the alternating-current side to taps on the interconnected transformer windings in order to impress reduced voltages thereupon for the starting operation, it is found that there is a considerable difference in phase relationship between the reduced starting voltages and the corresponding full running voltages. As a consequence, high currents may flow when the rotary is switched from the starting position on the transformer windings to the running position. In many instances, the currents arising from the phase displacement of the starting and running voltages, may be of such dangerously high values as to cause a shut-down on the alternating current supply mains.

One object of our invention is to provide a transforming system for rotary converters whereby the running voltages will be in phase with the starting voltages, thus precluding the flow of abnormal currents when the rotary converter is switched from the starting position on the transformer windings to the running position.

For a better understanding of the nature and scope of our invention, reference may be had to the following description and the accompanying drawings in which Figure 1 is a vectorial diagram representing the vector relationship of the voltages that are impressed upon a rotary converter during the starting and running operations when the rotary converter is started in the usual manner by connecting it to taps formed upon Y-connected transformer windings; Fig. 2 is a diagrammatic representation of a system of transformer connections whereby the starting voltages impressed upon a rotary converter coincide in phase with the running voltages impressed thereupon; Figs. 3 and 4 are vectorial diagrams representing the vector relationships of the starting voltages and running voltages, respectively, that are impressed upon the alternating-current side of a rotary converter connected to the transformer windings as shown in Fig. 2; Figs. 5, 6 and 7, and Figs. 8, 9 and 10 show modifications of the system disclosed in Fig. 2 and represent the vector relationships of the voltages successively impressed on the alternating-current side of a rotary converter.

By referring to Fig. 1, it will be apparent that the running voltages impressed upon the alternating-current side of a rotary converter are considerably out of phase with the corresponding starting voltages. As is well known in the art, it is usual to connect a three-wire, three-phase rotary converter to a bank of transformers, the primary windings of which are supplied with currents from a three-phase source. The secondary winding of each transformer comprises two sections, one winding-section of each secondary being connected to a winding-section of another secondary winding, so that unbalanced direct currents flowing through the neutral wire of the three-wire system will flow equally through all the transformer windings. As shown, vectors 1 and 2 represent the voltages induced in the two winding-sections comprising the secondary winding of one phase of the three-phase system, vectors 3 and 4 represent the voltages induced in the two winding-sections comprising the secondary winding of the second phase of the three-phase system, and vectors 5 and 6 represent the voltages induced in the two winding-sections comprising the secondary winding of the third phase of the three-phase system. The secondary winding-sections are so interconnected, as is well known in the art, that a neutral point 7 is provided which constitutes the neutral point of a modified interconnected Y, one branch of the Y comprising winding-sections represented by the vectors 1 and 4, another branch comprising those represented by the vectors 3 and 6, and another branch comprising those represented by the vectors 5 and 2. For starting a rotary converter, taps are provided on the secondary coil sections which taps may be represented by points 8, 9 and 10 of Fig. 1. The voltages impressed upon the alternating-current side of the rotary converter for the starting operation, are, therefore, represented in length and phase by vectors 8—9, 9—10 and 10—8. After the rotary converter has been brought up to speed, the alternating-current side is subsequently connected to all of the transformer windings, and, in this instance, the voltages impressed upon the rotary converter are represented by vectors 11—12, 12—13 and 13—11. Thus, it will be seen that the vectors representing the running voltages are considerably out of phase with the corresponding vectors representing the starting voltages. Because of this phase displacement, large currents will flow when the rotary converter is switched from the starting taps on the transformer windings to the running position on the transformer windings, thereby causing disturbances upon the alternating-current supply system.

To overcome the above-mentioned difficulty, we have invented a system of connections such as is shown in Fig. 2. A rotary converter, represented at 14, supplies power through its direct-current side to a three-wire distributing system comprising conductors 15' and a neutral conductor 16. The neutral conductor 16 is connected, as is customary, to a second neutral conductor 17 which, in turn, represents the neutral point on the transformer secondary windings. The alternating-current side of the rotary converter 14 is connected, through a switching mechanism 18, to secondary windings A, $A_1$, B, $B_1$, C and $C_1$ of transformers A', B' and C', respectively. The primary windings of these transformers are connected to any suitable source of three-phase current supply. When the rotary converter 14 starts with one-third of the normal operating voltage, the specific connections employed are illustrated in Fig. 2.

Corresponding terminals of the secondary winding-sections $A_1$, $B_1$ and $C_1$ are connected to the neutral conductor 17. With the switching mechanism 18 in the starting position, the alternating-current side of the rotary converter is supplied with three phase currents from the secondary winding-sections $A_1$ and B which are connected to each other in open-delta relationship, as shown by the vectorial diagram in Fig. 3. Tracing through the connections, an alternating-current lead 19 is connected, through a switch blade 20, to a conductor 21 which, in turn, is connected to the neutral conductor 17. A second alternating-current supply main 22 is connected, through a switch blade 23, to a conductor 24 which, in turn, is connected to one side of the secondary winding section B, the other side of the winding B being connected, through a conductor 25 and a switch blade 26, to the conductor 21, which, in turn, is connected to the neutral conductor 17. A third alternating-current supply main 27 is connected, through a switch blade 28, to a conductor 29 that, in turn, is connected to a connector 30 established between secondary winding-sections $A_1$ and C.

By referring to Fig. 3, it will be apparent that the alternating current lead 19 is connected to the neutral point 7, the alternating current main 22 is connected to the extremity of the vector B, and the alternating current main 27 is connected to the extremity of the vector $A_1$. In other words, the electromotive forces impressed upon the alternating-current side of the rotary converter during the starting operation are supplied by the windings $A_1$ and B which are connected in open delta.

After the rotary converter has been brought up to speed, the switch 18 is moved to the running position, thus impressing normal voltages upon the rotary converter. With the switch 18 in this position, the winding C is connected to the winding $A_1$, the winding A is connected to the winding $B_1$, and the winding B is connected to the winding $C_1$, these secondary winding-sections being connected in series relationship in order to generate the running voltages, corresponding ones of which will be in phase coincidence, respectively, with the starting voltages. During normal running operation, the alternating-current main 19 is connected, through the secondary winding-sections A and $B_1$, to the neutral conductor 17, the alternating-current main 22 is connected, through the secondary winding sections B and $C_1$, to the neutral conductor 17, and the alternating-current main 27 is connected, through secondary winding sections C and $A_1$, to the neutral conductor 17. Therefore, the full operating voltages may be represented by vectors 31—32, 32—33 and 33—31, of Fig. 4.

By comparing the phase relationship of the vectors representing the operating voltages and the starting voltages of Figs. 4 and 3, respectively, it will be apparent that corresponding voltages are in phase coincidence with one another so that, when the rotary converter is switched from the starting to the running position, abnormally high currents are precluded from flowing because of the phase coincidence between the starting and running voltages. For instance, the vector 31—32 of Fig. 4 is in phase coincidence with the resultant of the voltages induced in the windings $A_1$ and B of Fig. 3, and the vector 32—33 is in phase coincidence with the voltage induced in the winding $A_1$, and vector 33—31 is in phase coincidence with the voltages induced in the winding B.

Figure 7:
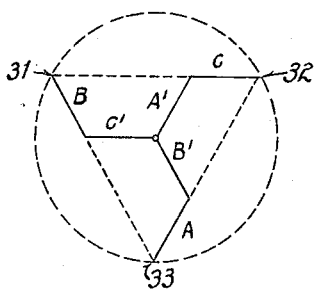
Figure 6:
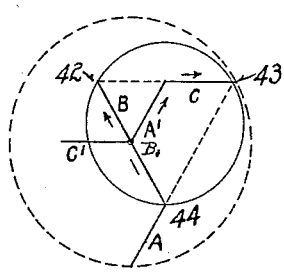

When the rotary requires a starting voltage equal to two-thirds of the normal running voltages, the system of connection employed is illustrated in Fig. 5, and the vector relationship of the voltages impressed during the starting and running positions may be represented by the vector diagrams of Figs. 6 and 7, respectively. With the switch 18 in the starting position, the alternating-current main 19 is connected, through the switch blade 20, a conductor 34 and a conductor 35, to the winding $B_1$ which, in turn, is connected to the neutral conductor 17. The alternating-current main 22 is connected, through the switch blade 23, a conductor 36, the winding B, a conductor 37, the switch blade 26, and a conductor 38, to the neutral conductor 17. The alternating-current main 27 is connected through a switch blade 28, a conductor 39, a conductor 40, the winding C, a conductor 41, and the winding $A_1$, to the neutral conductor 17. The phase relationship of the vectors representing the voltages of the windings B, $B_1$, $A_1$ and C is shown in Fig. 6, and, likewise, the voltages impressed upon the alternating-current mains 19, 22 and 27, during the starting operation, are represented by vectors 42—43, 43—44 and 44—42.

When the switch 18 is in the running position, the secondary winding-sections of the transformers are assembled, with respect to one another, as explained in relation to Figs. 3 and 4, the voltages impressed upon the alternating current side of the rotary converter being represented by the vectors 31—32, 32—33 and 33—31 of Fig. 7. Moreover, the vectors representing these running voltages are in phase coincidence with the corresponding vectors of Fig. 6 which represent the starting voltages, namely, vector 31—32 of Fig. 7 is in phase with vector 42—43 of Fig. 6, vector 32—33 is in phase with vector 43—44 and vector 33—31 is in phase with vector 44—42. As a consequence, no abnormal currents are caused to flow when the alternating-current side of the rotary converter is switched from the starting position to the running position upon the transformer windings.

If the starting voltages required to start the rotary converter have values between one-third and two-thirds of the normal operating voltages, the system of connections shown in Fig. 8 is employed, the windings $B_1$ and C being supplied with taps 45 and 46, respectively. The connections of Fig. 8 are similar to those shown in Fig. 5, the alternating-current mains 19 and 27, however, being connected to the taps 45 and 46, respectively of Fig. 8, instead of to the extremities of the windings $B_1$ and C, of Fig. 5. When the switch 18 is in the starting position, the voltages impressed on the alternating-current mains 19, 22 and 27, are represented by vectors 47—48, 48—49 and 49—47 of Fig. 9, the electrical connections in this instance being similar to those established in the system of Fig. 5 when the switch 18 is in the starting position, and, therefore, further explanation thereof is not deemed necessary. Moreover, when the switch 18 is in the running position, the voltages impressed upon the alternating-current mains of the rotary converter are represented by the vectors 31—32, 32—33 and 33—31 of Fig. 10. As explained above, these vectors representing the normal operating voltages, must be in phase coincidence with vectors representing the corresponding starting voltages of Fig. 9. In other words, vector 31—32 of Fig. 10 is in phase coincidence with vector 47—48 of Fig. 9; likewise, vector 31—33 is in phase coincidence with vector 47—49, and vector 33—32 is in phase coincidence with vector 49—48.

While we have shown and described several embodiments of our invention, it will be apparent to those skilled in the art that many modifications may be made without departing from the spirit and scope of the appended claims.

We claim as our invention:

1. The combination with a three-wire, three-phase rotary converter, a plurality of transformer windings forming an interconnected star-formation and having a neutral point to which the main conveying the unbalanced direct currents is connected, and means for supplying three-phase currents to said windings, of switching means for connecting a portion of said transformer windings to the alternating-current side of the rotary converter in order to impress starting voltages thereupon and for subsequently impressing full operating voltages on the rotary converter, the full operating voltages being in phase coincidence with the corresponding starting voltages.

2. The combination with a three-wire, three-phase rotary converter, a plurality of transformer windings forming an interconnected star and having a neutral point to which the main conveying the unbalanced direct currents is connected, and means for supplying three-phase currents to said windings, of switching means which, in one position, connects a portion of said transformer windings to the alternating-current side of the rotary converter in order to impress thereupon voltages below normal value and which, in another position, connects all of said transformer windings thereto in order to impress thereupon normal operating voltages, the voltages impressed on the rotary converter when the switch is in said first position being in phase coincidence with corresponding voltages impressed thereupon when the switch is in said second position.

3. The combination with a three-wire, three-phase rotary converter, a plurality of transformer windings forming an interconnected star and having a neutral point to which the main conveying the unbalanced direct currents is connected, and means for supplying three-phase currents to said windings, of switching means for connecting said transformer windings to the alternating-current side of the rotary converter, said switching means, when in the starting position, impressing voltages less than normal value upon said rotary converter, and when in the running position, impressing normal voltages upon said rotary converter, the starting voltages and the running voltages coinciding in phase with each other.

4. The combination with a three-wire, three-phase rotary converter, a plurality of transformer windings forming an interconnected star and being connected to a neutral point to which the main conveying the unbalanced direct currents is permanently connected, and means for supplying three-phase currents to said transformer windings, of means for connecting a portion only of said transformer windings to the rotary converter during the starting operation and for subsequently connecting all of said transformer windings thereto for the normal running condition, the change-over from the first to the second condition being accomplished without effecting any phase displacement between the corresponding starting and running voltages that are impressed upon the alternating-current side of said rotary converter.

5. The combination with a three-wire, three-phase converter, and three-phase transformer windings, the secondary windings of each phase being divided into two sections and one section only of each of said secondary windings being permanently connected to a common point to which the main conveying the unbalanced direct currents is permanently connected, of means for connecting one winding-section of at least two of said secondary windings to the rotary converter during the starting operation and for subsequently connecting all of said secondary winding-sections to the rotary converter during the normal operation thereof, the secondary winding-sections of each phase being connected in series with the secondary winding-section of other phases during the normal operation of the rotary, thus forming an interconnected "Y" formation so as to produce no phase displacement between the starting voltages and the running voltages impressed upon the rotary converter.

In testimony whereof, we have hereunto subscribed our names this 31st day of March, 1915.

WALTER M. DANN.
HAROLD H. RUDD.

Copies of this patent may be obtained for five cents each, by addressing the "Commissioner of Patents, Washington, D. C."